March 17, 1964  E. BURALLI  3,125,307
MACHINE FOR WINDING COILS IN GROOVES OF STATOR RINGS
Filed Nov. 15, 1961  2 Sheets-Sheet 1
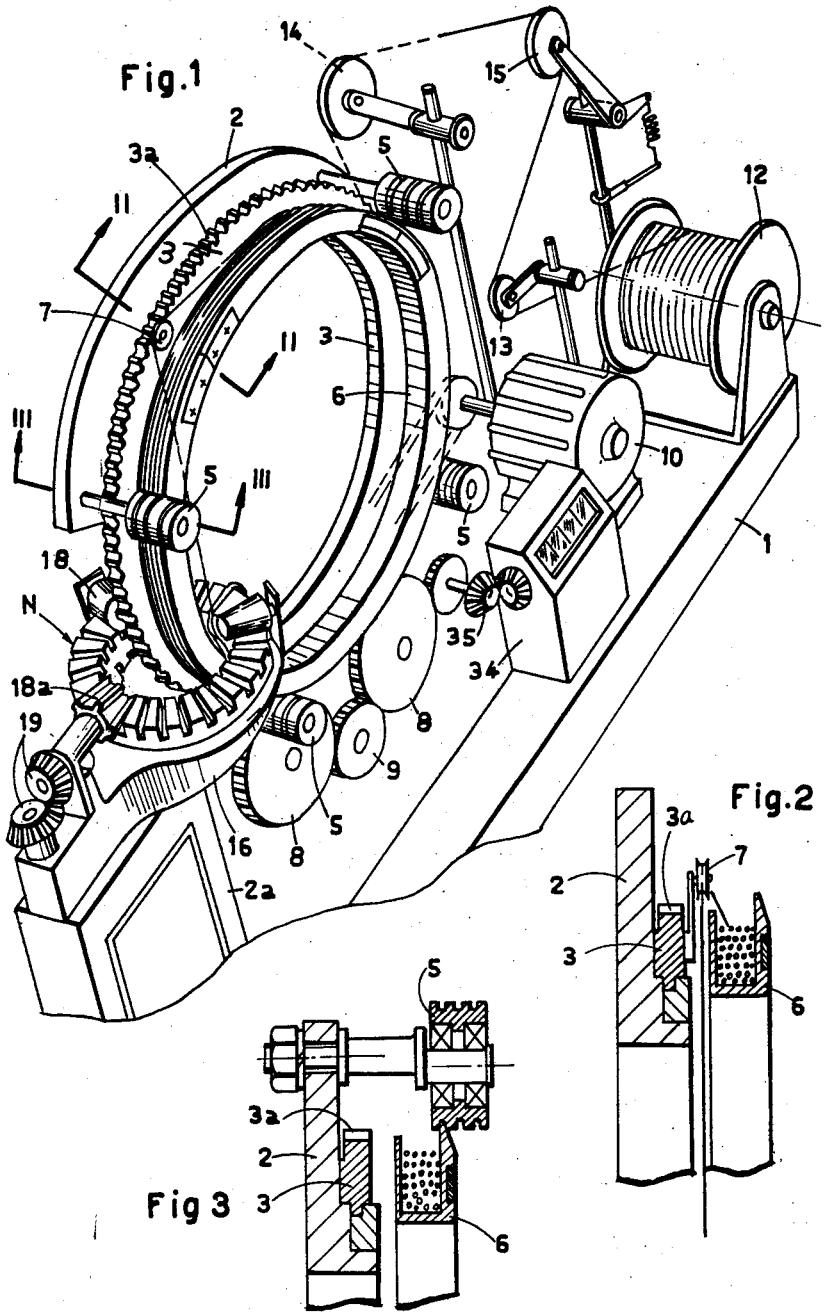
INVENTOR:
ETTORE BURALLI
by Squire + Olcott
ATTYS March 17, 1964     E. BURALLI     3,125,307
MACHINE FOR WINDING COILS IN GROOVES OF STATOR RINGS
Filed Nov. 15, 1961     2 Sheets-Sheet 2

INVENTOR:
ETTORE BURALLI
by Squire + Olcott
ATTYS

United States Patent Office 3,125,307
Patented Mar. 17, 1964

3,125,307
MACHINE FOR WINDING COILS IN GROOVES
OF STATOR RINGS
Ettore Buralli, Florence, Italy, assignor to Remital Societa per Azioni Studio e Realizzazioni Elettromeccaniche, Florence, Italy, a corporation of Italy
Filed Nov. 15, 1961, Ser. No. 152,445
Claims priority, application Italy Nov. 19, 1960
4 Claims. (Cl. 242—4)

This invention relates to a machine for winding coils in channels or grooves of the magnetic circuits of ring type stators of alternating current, single phase or polyphase electric machines.

The invention essentially concerns a new machine for setting up these stators for winding. The invention has as its object provisions of a machine which enables:

(a) The introduction of wire into the grooves of stator rings in such a manner as to assure complete filling of the grooves in the rings;

(b) The cyclic turning of the rings to wind wire in grooves spaced predetermined distances apart.

The invention includes means for exerting a stress on the wire in the central plane of each groove.

The stress imposed on the wire being wound is maintained by a wire-guide which is moved circularly in a diametral plane of the magnetic ring and around the ring outside of the groove. This wire guide keeps the wire or conductor under a mechanical tension sufficient to assure strong clamping of the different layers of the wire to each other and to the bottom of the groove.

The machine includes an annular shuttle for storing wire in addition to the wire-guide. A support is provided for the magnetic ring designed to allow turning movement of the shuttle and access to the grooves for free passage of the wire. This support is essentially formed, according to the invention, by a radially cut or forked base and by rollers which are applied onto the lateral surfaces of the ring. Means are also provided for turning the ring cyclically around the longitudinal axis of the ring. The ring is turned angularly predetermined distances so that the middle plane of each groove coincides with the plane of the shuttle. This is done by a system of gears and a ratchet means.

The machine assembly is provided with a pawl controlled mechanism to control the number of wire turns to be introduced into the grooves and to assure the automatic passage of wire from one wound groove to an empty groove, immediately adjacent or to a groove somewhat distant with respect to the wound groove. The machine includes an annular rotatable ring gear which carries the wire guide in a circular path. The wire guide is supplied with wire from an annular wire storing shuttle. The ring gear and shuttle can be opened for insertion into and encirclement of the annular magnetic core or ring to be wound. The annular support of the wire guide is provided with drive means under control of a revolution counter.

In order to support the ring forming the magnetic core, there is provided an open-fork support means which permits turning of the ring. Turning of the core is accomplished by drive means under control of the revolution counter which indicates the number of revolutions effected by the wire-guide. The annular magnetic core or ring is moved in such a manner as to present a groove in the plane of travel of the wire-guide after it fills the adjacent groove or of a groove spaced from the filled groove by an appropriate number of grooves, according to the arrangement of the windings to be provided for the electric machine.

The invention will be better understood from the following description and the accompanying drawings which illustrate an embodiment given as an example of the invention. In the drawings:

FIG. 1 illustrates a general perspective view of the machine;

FIGS. 2 and 3 are two cross-sections taken along the lines II—II and III—III respectively of FIG. 1;

Figure 4:
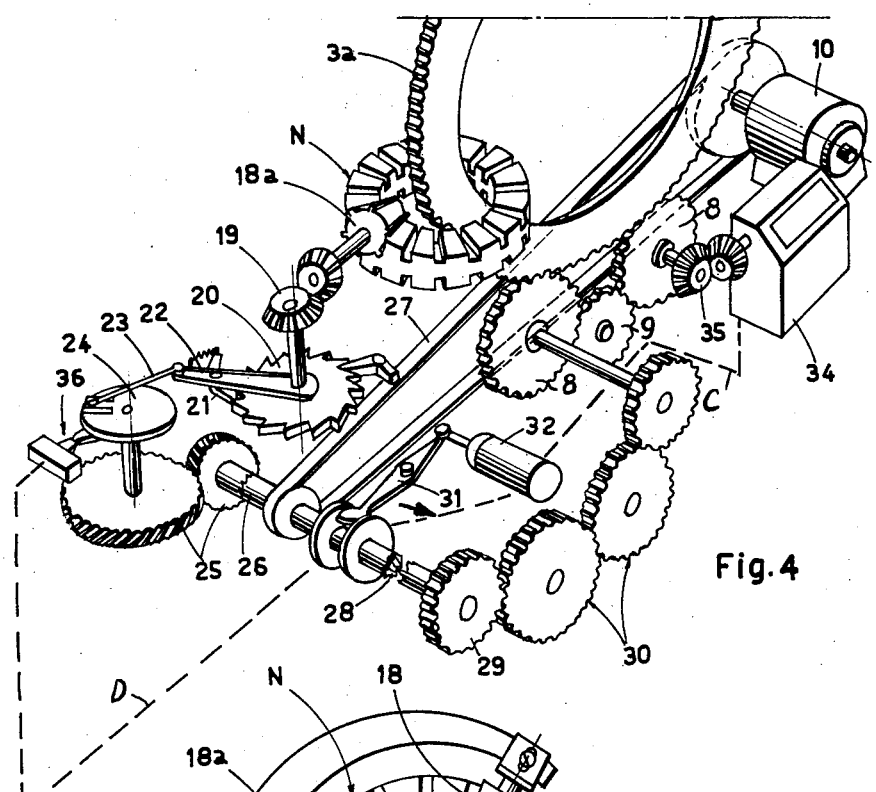
FIG. 4 is a perspective view of parts of the drive mechanism of the magnetic core to be wound.
Figure 5:
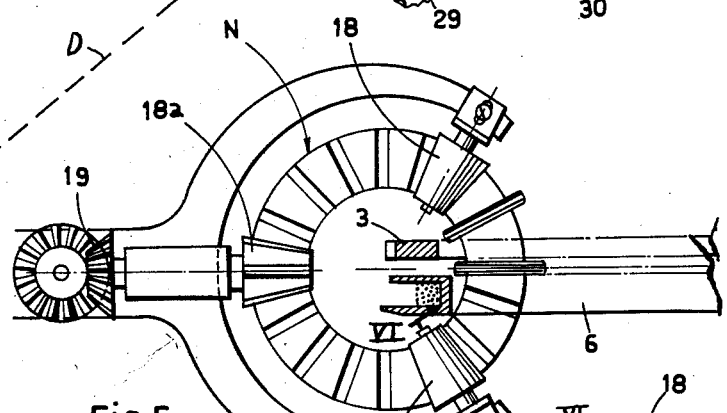
FIG. 5 is a plan view of a magnetic core and the support for the magnetic core to be wound.
Figure 6:
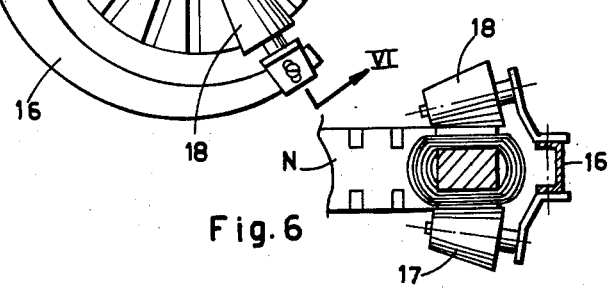
FIG. 6 is a section taken along the line VI—VI of FIG. 5.

According to the drawing, there is shown a base 1 upon which a vertical support 2 is mounted to support in a rotatable manner a ring gear 3 having external teeth 3a. The complete supporting means of the ring gear 3, 3a, are not visible but may include suitable roller means or the like. On the support 2 there are also carried some idler rollers 5 provided with grooves or races which support an annular shuttle 6 of U-shaped cross-section. A side of the shuttle 6 is engaged in a race of each of the rollers 5 in such a way that the shuttle is free to rotate coaxially with ring gear 3, 3a and axially spaced therefrom as seen particularly in FIGS. 2 and 3. The ring gear 3, 3a bears a wire-guide 7 which serves for the delivery of the wire to the magnetic core to be wound when the ring gear 3, 3a is rotated. The ring gear is rotated by a pair of gears 8 spaced apart and operatively connected with each other by an intermediate gear 9, driven for instance by a motor 10, borne by the base. The annular magnetic core or ring N which is to be provided with the wire windings is shown in FIGS. 1, 4, 5 and 6. In order to interengage or couple match each other, the core N with the ring gear and the shuttle 6, each of the latter in formed in with a removable sector which permits insertion of the ring gear and shuttle into the central aperture or window of the annular core N. The removable sectors are then restored. In order to supply the shuttle 6 with wire, there is provided a coil 12 from which the wire may be delivered via wire-guides 13, 14, the wire being held taut by a tensioning device 15. Through this arrangement, the wire is wound in a desired quantity onto the storing shuttle 6 after the ring gear 3, 3a and the shuttle 6 have been arranged to pass through the central aperture of the core N.

In order to support the core N, on a portion 2a of the vertical support 2, there is provided a horizontal forked support 16 which is provided with lower guide rollers 17 by which the core N is supported for rotation about its central axis. The support 16 is additionally provided with pressure rollers 18 which engage and guide the upper surface of the core N. There is also a drive roller 18a. The guide rollers 17 and pressure rollers 18, together with the drive roller 18a, operate to provide correct centering and easy rotation of core N. The drive roller 18a is provided with some ribs, like gear teeth, by means of which a positive drive is imparted to the core N, the ribs or teeth having a pitch which corresponds to the angular pitch of the radial slots in the core N. The teeth of the drive roller 18a engage in the radial slots or grooves in the upper surface of the core N. The drive roller 18a is driven through a pair of bevel gears 19 one of which is fast on an upright shaft drivingly connected to a ratchet wheel 20 co-operating with pawl 21 of a pawl system. The pawl system includes a small lever 22 driven by a link member 23 connected to the crank pin of an adjustable eccentric 24. The eccentric 24 is driven by a pair of spiral gears 25 through a clutch 26 schematically indicated in FIG. 4. The drive member of the clutch 26 is actuated by the motor 10 through belt 27. A second clutch 28 whose drive member is also actuated by the motor 10 controls coupling with a drive wheel 29 which is connected through a transmission comprising gearing 30, to the drive wheels 8 of the ring gear 3, 3a. There is provided, for selectively controlling the coupling of the two clutches 26, 28, a lever 31 which is controlled by an electromagnetic system 32. For controlling the number of turns which are wound in a particular pair of slots of the core N, there is provided a presettable counter 34. The counter 34 operates during engagement of the clutch 28 and, by means of a control circuit C, actuates the electromagnetic system 32 to stop the further winding of wire when counter attains the correct count. The adjustable eccentric 24 is operatively associated with a switch designated generally as 36 which operates once for each revolution of the eccentric 24. The switch 26 controls the electromagnetic system 32 through a control circuit D to connect and disconnect the clutch 26 for operating the ratchet wheel 20.

After the winding of the wire onto the shuttle 6, effected without the wire-guide 7 and when the core N has been located on its support as described, the winding operation on the magnetic core N may be performed. The wire-guide 7 may be fixed onto the ring 3 after the shuttle is supplied with wire and one end of the wire is anchored to the core N. The core is located with one of its grooves or with a pair of opposite grooves in alignment with the plane of rotation of the wire-guide 7. The motor 10 is started in the direction opposite the winding direction of the wire on the shuttle, to determine the rotation of the ring 3 with the wire-guide 7. The shuttle turns idly on support rollers 5. In this way, the wire previously wound on the shuttle is transferred onto the core N to form the winding in the first pair of grooves. After the ring 3 has effected a requisite number of turns and after a corresponding number of turns has been effected in the pair of grooves, the revolutions counter 34 actuates the electromagnetic device 32. This device 32 pivots lever 31 which actuates clutches 26, 28 to stop rotation of ring gear 3, 3a. The eccentric 24 then effects a revolution causing an angular trip of the ratchet wheel 20 and thus of the drive roller 18a to impart a corresponding angular movement to core N. This movement may equal the angular distance between any two grooves. After having effected a revolution, the eccentric 24 through the switch 36 in circuit with the electromagnet 32 may actuate the electromagnet to disengage clutch 26 and recouple with clutch 28 to start driving ring gear 3, 3a. Thus, a new winding may be made in the groove or pairs of grooves now located in the winding position. The revolutions counter 34 may be returned to zero before winding starts again in order to determine the number of turns in the new groove or pair of grooves.

The system according to the invention makes possible assembly of the windings in a core in a substantially fully automatic manner.

While I have shown and described what I believe to be the best embodiments of my invention, it will be apparent to those skilled in the art that various changes and modifications may be made therein without departing from the spirit and scope of the invention as defined in the appended claims.

What I claim is:

1. A machine for winding wire in circumferentially spaced grooves of a flat ring, comprising a horizontal support for said ring, a ring gear rotatable in a vertical plane and carrying a wire guide extending laterally of the gear, a grooved annular shuttle carrying a supply of wire and rotatable in a vertical plane slightly spaced from said gear, said wire guide drawing wire from said shuttle as the ring gear revolves, said ring gear and shuttle passing through the central aperture of the flat ring to be wound with wire, a plurality of rollers supporting said shuttle for free rotation in a vertical plane as wire is drawn therefrom, a drive gear having teeth engaging in the grooves of the flat ring for rotating the same in its plane on said support, a motor, a gear train engaged with said ring gear for turning the same, and double clutch means operatively connected between the motor and both said gear train and said drive gear for alternately driving the ring gear to wind wire in a selected groove and turning the flat ring to locate another groove in winding position for filling with said wire.

2. A machine according to claim 1, further comprising electromagnetic means operatively connected to said double clutch for actuating the same, and a counter operatively connected to said gear train and said electromagnetic means for stopping rotation of the ring gear after a predetermined number of turns of wire are wound in a groove and for actuating the drive gear to turn the flat ring and advance said other groove to said winding position.

3. A machine according to claim 2, further comprising switch actuated means between said drive gear and said clutch means and driven thereby for stopping the drive gear and actuating said electromagnetic means to actuate the clutch means and start rotation of the ring gear and winding of the wire in said other groove.

4. A machine according to claim 3, wherein said support for the flat ring includes a forked member carrying a plurality of pairs of spaced rollers engaging the flat ring on opposite sides thereof, and further comprising another gear train driven by said clutch means, an eccentric driven by said other gear train and driving a crank, and a pawl actuated ratchet operatively connected to said drive gear, said pawl being operated by said crank, whereby the drive gear is turned and the flat ring is rotated upon each actuation of the ratchet through an angular distance equal to an integral multiple of the distance between two adjacent grooves in the flat ring.

References Cited in the file of this patent

UNITED STATES PATENTS

| | | |
|---|---|---|
| 1,667,070 | Jones et al. | Apr. 24, 1928 |
| 1,827,186 | Borgeson | Oct. 13, 1931 |
| 2,444,126 | Wirth | June 29, 1948 |
| 2,726,817 | Barrows | Dec. 13, 1955 |
| 2,865,573 | Tarara et al. | Dec. 23, 1958 |
| 2,865,574 | Blumentritt | Dec. 23, 1958 |
| 3,030,038 | Baker et al. | Apr. 17, 1962 |

FOREIGN PATENTS

| | | |
|---|---|---|
| 660,218 | Great Britain | Oct. 31, 1951 |